UNITED STATES PATENT OFFICE.

DAVID CHIDLOW, OF WASHINGTON, DISTRICT OF COLUMBIA.

PROCESS OF MAKING BREAD.

No. 862,962.　　　Specification of Letters Patent.　　　Patented Aug. 13, 1907.

Application filed March 11, 1907. Serial No. 361,740.

*To all whom it may concern:*

Be it known that I, DAVID CHIDLOW, a subject of the King of Great Britain, residing at Washington, District of Columbia, have invented certain new and useful Improvements in Methods of Making Bread, of which the following is a specification.

My present invention relates to the method of preparing a sponge for use in connection with the preparation of a dough for bread making.

All methods of bread making come under two divisions, one, straight dough, and the other, sponge and dough. The straight dough is that in which all of the flour and other ingredients used are made up at once into a dough which is allowed to ferment, with occasional kneading, until it is deemed ready for making into loaves. The other division is that in which a part of the flour and water are made into a preliminary soft dough or sponge and allowed to ferment to a certain degree, then the balance of the ingredients added and the whole formed into a dough now corresponding to the straight dough.

All sponges are made to be ready at a certain moment, which is conceived as ideal. For example, if a sponge is designed for a certain kind of bread and the sponge is to be ready in four hours, if all the conditions have been conformed to, the sponge is just ready in four hours. If the sponge is left for five hours, the bread obtained from the subsequent dough is poor, and if allowed to stand four and a half hours, it would not be so good as if taken at four hours. The experience of the baker may partly remedy the overworked sponge by adding more flour and salt at the dough stage, but the bread is less satisfactory than when the sponge is taken at the moment it is conceived to be ready. This statement applies to all systems of sponges; they all deteriorate after the time for which they are prepared to be taken has passed. This is a fact well understood by bakers all over the world and partly, also, by the majority of housekeepers making their own bread.

An example of the operation of the principle of sponges is shown in the making of a world-famous bread derived from Austria and known as Vienna bread. The sponge is made by using the proportions of 40 lbs. flour,
　　　 1 " compressed yeast,
　　　29 " water,
　　　sponge temperature 83 to 85.

This is fermented three hours, during which time the sponge rises, then slightly falls by reason of it being unable to withstand further distention by the gases of fermentation. There is then added 29 lbs. milk;
　　　 1½ " salt;
　　　60 " flour;
　　　dough made at a temperature of 84 to 86.

This is allowed to ferment for three hours with possibly an intermediate kneading. It is then made up into loaves. The greatest care is exercised in the best bakeries not to take the sponge before it is ready, nor to let it stand after it is ready, and this readiness is judged almost entirely by the slight dip in the rounded surface of the sponge or by the more or less definite drop of the sponge, in other words, by the appearance of the sponge to the eye. To whatever point this drop is allowed, when it is reached, the sponge is ready and must be taken at that moment. It is a common experience in bake-shops to have a baker standing by the sponge waiting for the sponge to drop. This is an important feature in all sponges, and more bread is spoiled by the professional baker as well as in homes by an over-fermented sponge than by any other single cause.

In some breads, it is essential in the art of bread making to more completely effect a chemical change in a part of the flour rather than a partial change in the whole of the flour, and this is accomplished by use of the sponge method.

The object of my invention is to overcome the uncertainty in the producing of sponge for use in the preparation of the dough for bread making and to render the character of the sponge absolutely certain, and, further, to produce a sponge that does not have to be used at a predetermined time, but may be used at will and when desired.

My method consists in making a very soft batter sponge, to which is added yeast and acid, and, if desired, a small proportion of salt and sometimes sugar or other saccharine matter. This is fermented for nine hours under ordinary conditions, but can be used up to three or four days after being made without detriment to the bread. The sponge can be made so as to be ready in two hours if required, but, ordinarily, the conditions are such as to render this unnecessary. Furthermore in the ordinary methods of bread making, there is required about seventy (70) pounds of a stiff sponge to be added to sixty (60) pounds of flour with the other ingredients required for dough making. By my method I add ten (10) pounds of a semi-liquid batter sponge to sixty (60) pounds of flour; there is no labor involved in breaking my sponge up so as to mix readily into the dough.

The principles of my improved sponge are: to allow the acid to act upon a small portion of the flour in the presence of fermentation; then, to add this flour so chemically changed to be distributed through the balance of the flour to be used in making the dough.

From the fact that this sponge may be allowed to stand a practically unlimited period, within reason, after the sponge is ready, it is clear that practically no bacterial action goes on in the completed sponge, that is, the bacterial action caused by the functioning of lactic acid bacteria and associated types of organized ferments. In usual methods of breadmaking, where a sponge is used, bacteria (meaning the associated types previously referred to) reproduce freely, the by-products being chiefly lactic acid and occasionally butyric acid. By the use of acid in the sponge, as herein set forth, this activity is arrested. It is true in a strict sense that all foods undergo a change, and when I state that there is practically no bacterial action, I mean within a practical limit of time for which such sponges would be prepared. For instance, if twenty doughs were to be made up at periods of half an hour apart, my sponge could be made in one vessel and a given weight or measure of it taken for each dough as required, whereas in the usual method, each dough would require a separate sponge, each properly timed for addition to the other ingredients in preparing each dough. In a primary sense, the real improvement is in the addition of acid; in a secondary sense, but one depending upon the presence of acid, there is a large increase of yeast. The results obtained by the use of this improved sponge are even of greater value than those obtained by the use of acid in straight dough, as set forth in my pending application, Serial No. 324,104, filed June 29, 1906.

In carrying out my method, I proceed in the following manner: Assuming the use of the usual bread flour, I take .171 pounds of yeast, .063 pounds of salt, .342 pounds of sugar, 7.438 pounds of flour, 11.286 pounds of water, and mix to form a batter. To this batter I add .063 pounds of acid. The entire mixture is then allowed to stand for a period of nine hours. At this stage fermentation practically ceases for the well known reason of the exhaustion of nutriment and the batter sponge is ready for use in making the finished dough at any time for a period of forty eight hours or thereabouts. When it is desired to prepare the dough for making the bread, the above mixture is added to 93 pounds of flour; 29 pounds of milk, or in lieu of milk, a mixture of fats and saccharine substances equivalent to these contained in the milk, or, in some instances, for certain breads, milk or its equivalent may be omitted altogether or increased in quantity in others; 18 pounds of water; 1.30 pounds of salt, and the dough thus formed allowed to stand for four hours; fermentation ensuing on the addition of the sponge to the flour and other nutritive ingredients, when it is ready for baking.

The sponge made by the ordinary method, wherein no acid is used, must be taken at the moment the same is ready, otherwise, if allowed to stand too long, the same will deteriorate and not produce the desired quality of bread when finally used. By my method, however, by the addition of the acid, I am enabled to produce, as hereinbefore set forth, a sponge which may be allowed to stand for 48 hours, if desired, and the same results obtained by its use as are produced by the ordinary sponge method when taken at the moment it is ready. The reason why my sponge can be allowed to stand until ready to be used is due to the fact that by the addition of the acid in proportion specified, bacterial action in the sponge practically ceases at a time certain. The sponge having been prepared as above set forth and being in a semi-liquid state, when it is desired to prepare the dough for the purpose of making bread, the necessary quantity of the sponge is dipped out and mixed with the necessary flour and the dough prepared ready for the baking.

In my experience, I have discovered that I may use any of the following acids and obtain practically the same results, each of said acids, when used in the proper proportions, being equivalents of the other: acid tartrate of potash; sulfuric acid; acid potassium sulfate; hydrochloric acid; tartaric acid; acid sodium tartrate; acetic acid; lactic acid; butyric acid; succinic acid; oleo acid, as well as mixtures of these acids, the particular acid to be used in a given case depending on the character of the flour used in the process.

It will be apparent, of course, to those skilled in the art that other acids may be used to accomplish the same result and I, therefore, do not limit myself to the particular acids specifically named herein.

Having thus fully described my invention, what I claim as new and desire to secure by Letters Patent of the United States is:

1. The method of making sponge for use in bread making, which consists in mixing together flour, yeast, water, and acid in substantially the proportions specified, and allowing the mixture to stand for a predetermined period, whereby acid fermentation is prevented in the sponge after the propagation of the yeast has ceased.

2. A sponge for use in bread making, comprising flour, yeast, water and acid mixed in substantially the proportions specified, in which the propagation of yeast has substantially ceased and acid fermentation avoided for a predetermined period.

In testimony whereof I affix my signature in presence of two witnesses.

DAVID CHIDLOW.

Witnesses:
CHAS. E. RIORDON,
ARCHIBALD YOUNG.